US008279039B2

(12) United States Patent
Thorn

(10) Patent No.: US 8,279,039 B2
(45) Date of Patent: Oct. 2, 2012

(54) USING TOUCHES TO TRANSFER INFORMATION TO A DEVICE

(75) Inventor: Ola Karl Thorn, Lund (SE)

(73) Assignee: Sony Mobile Communications AB, Lund (SE)

( * ) Notice: Subject to any disclaimer, the term of this patent is extended or adjusted under 35 U.S.C. 154(b) by 879 days.

(21) Appl. No.: 11/871,257

(22) Filed: Oct. 12, 2007

(65) Prior Publication Data

US 2009/0096610 A1    Apr. 16, 2009

(51) Int. Cl.
*G06F 7/00* (2006.01)
(52) U.S. Cl. ............... 340/5.51; 340/5.62; 340/5.82
(58) Field of Classification Search ............. 340/5.51, 340/5.52, 5.62, 5.82, 540, 568.1, 572.1, 572.4; 382/115, 188; 345/156, 173, 177; 348/384.1; 463/25; 439/152; 178/18.04
See application file for complete search history.

(56) References Cited

U.S. PATENT DOCUMENTS

| | | | |
|---|---|---|---|
| 5,986,224 A | 11/1999 | Kent | |
| 6,285,295 B1 * | 9/2001 | Casden | 340/12.24 |
| 6,340,931 B1 * | 1/2002 | Harrison et al. | 340/572.1 |
| 6,828,902 B2 * | 12/2004 | Casden | 340/10.3 |
| 6,898,299 B1 * | 5/2005 | Brooks | 382/115 |
| 6,903,662 B2 * | 6/2005 | Rix et al. | 341/22 |
| 6,950,009 B1 | 9/2005 | Nysen | |
| 7,100,835 B2 * | 9/2006 | Selker | 235/492 |
| 7,126,481 B2 * | 10/2006 | Vesikivi et al. | 340/572.4 |
| 7,183,925 B2 * | 2/2007 | Marshall et al. | 340/572.4 |
| 7,315,908 B2 * | 1/2008 | Anderson | 710/62 |
| 7,394,346 B2 * | 7/2008 | Bodin | 340/5.51 |
| 7,438,236 B2 * | 10/2008 | Top | 235/492 |
| 7,519,537 B2 * | 4/2009 | Rosenberg | 704/275 |
| 7,535,424 B2 * | 5/2009 | Henty | 343/702 |
| 7,643,010 B2 | 1/2010 | Westerman et al. | |
| 7,643,011 B2 | 1/2010 | O'Connor et al. | |
| 7,805,214 B2 | 9/2010 | Yamauchi et al. | |
| 2002/0126010 A1 * | 9/2002 | Trimble et al. | 340/568.1 |
| 2003/0079222 A1 | 4/2003 | Boykin et al. | |
| 2004/0002305 A1 * | 1/2004 | Byman-Kivivuori et al. | 455/41.2 |
| 2004/0124248 A1 * | 7/2004 | Selker | 235/492 |
| 2004/0246372 A1 | 12/2004 | Megeid | |

(Continued)

FOREIGN PATENT DOCUMENTS

EP    1 244 043 A2    9/2002

(Continued)

OTHER PUBLICATIONS

Press Releases: Nokia Mobile RFID Kit as part of the Nokia Field Force Solution is now commercially available, Feb. 21, 2005, http://press.nokia.com/PR/200502/981601_5.html, 2 pages.

(Continued)

*Primary Examiner* — Benjamin C Lee
*Assistant Examiner* — Stephen Burgdorf
(74) *Attorney, Agent, or Firm* — Sreenivas Vedantam; Moore & Van Allen PLLC

(57) ABSTRACT

A device may receive a signal that includes information about a touch pattern on a surface of the tag, identify the touch pattern based on the received signal, validate tag-specific information in the received signal by comparing the identified touch pattern and information that is stored prior to receiving the signal, and perform an action that is specified by the tag-specific information if the tag-specific information is validated.

17 Claims, 8 Drawing Sheets

U.S. PATENT DOCUMENTS

| | | | |
|---|---|---|---|
| 2004/0257202 A1* | 12/2004 | Coughlin et al. | 340/5.82 |
| 2005/0266919 A1 | 12/2005 | Rowe et al. | |
| 2006/0026521 A1 | 2/2006 | Hotelling et al. | |
| 2006/0034496 A1* | 2/2006 | Silverbrook et al. | 382/119 |
| 2006/0125804 A1 | 6/2006 | Kent | |
| 2006/0136734 A1* | 6/2006 | Telek et al. | 713/182 |
| 2006/0158341 A1* | 7/2006 | Chipchase et al. | 340/825.22 |
| 2006/0197752 A1 | 9/2006 | Hurst et al. | |
| 2006/0197753 A1 | 9/2006 | Hotelling | |
| 2007/0057790 A1* | 3/2007 | Alden et al. | 340/572.1 |
| 2007/0057792 A1* | 3/2007 | Alden | 340/572.1 |
| 2007/0128899 A1 | 6/2007 | Mayer | |
| 2007/0177803 A1* | 8/2007 | Elias et al. | 382/188 |
| 2007/0257890 A1 | 11/2007 | Hotelling et al. | |
| 2008/0167834 A1 | 7/2008 | Herz et al. | |
| 2009/0002176 A1 | 1/2009 | Bekritstky et al. | |
| 2009/0085877 A1* | 4/2009 | Chang et al. | 345/173 |

FOREIGN PATENT DOCUMENTS

| | | |
|---|---|---|
| GB | 2 317 092 A | 3/1998 |
| JP | 2006092376 A | 4/2006 |
| WO | WO 2004/003801 A1 | 1/2004 |

OTHER PUBLICATIONS

Nishiyama, S. et al.: Combining RFID Tag Reader with Mobile Phone: An Approach to Realize Everyone's Ubiquitous Appliances; 2006 International Symposium on Intelligent Signal Processing and Communication Systems (ISPACS2006), pp. 87-90.

Antoniou, Z. et al.: Intuitive Service Discovery in RFID-enhanced networks; Proceedings of the First International Conference on Communication System Software and Middleware (COMSWARE 2006), Jan. 8-12, 2006, 5 pages.

International Search Report and Written Opinion mailed Sep. 4, 2008 issued in corresponding international application No. PCT/IB2008/051395, 13 pages.

State Intellectual Property Office of China; First Office Action; Dec. 23, 2012; issued in Chinese Patent Application No. 200880110079.6.

Japanese Patent Office; First Office Action; Feb. 14, 2012; issued in Japanese Patent Application No. 2010-527572.

* cited by examiner

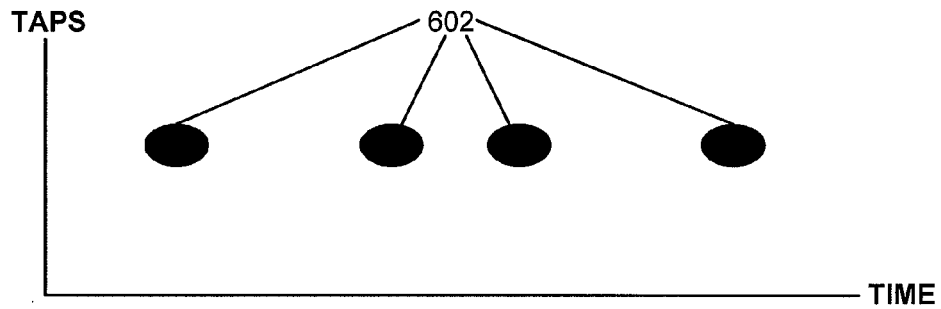
Fig. 6A
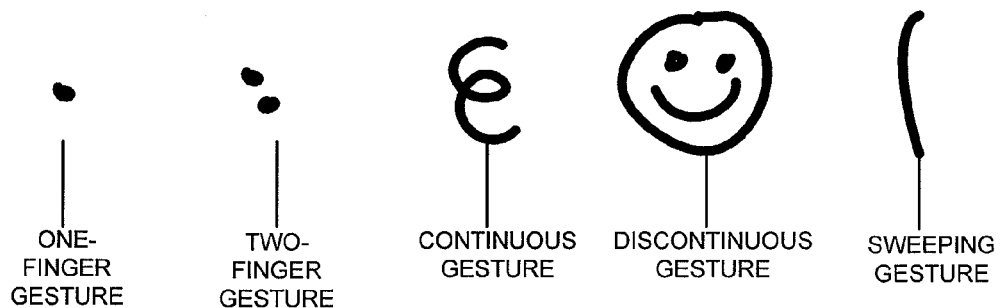
Fig. 6B
| | TAPS | ONE-FINGER GESTURE | TWO-FINGER GESTURE | JOINT GESTURE | NON-JOINT GESTURE | SWEEPING GESTURE |
|---|---|---|---|---|---|---|
| FINGER SIZE | Y | Y | Y | Y | Y | |
| FINGER SHAPE | Y | Y | Y | Y | Y | |
| FINGER SPEED | | Y | Y | Y | Y | Y |
| CAPACITANCE | Y | Y | Y | Y | Y | Y |
| TIME | Y | | | Y | Y | Y |
| DISTANCE BETWEEN FINGERS | | | Y | Y | Y | Y |
| PATTERN CONTINUITY | | | | Y | Y | |
Fig. 6C

USING TOUCHES TO TRANSFER INFORMATION TO A DEVICE

BACKGROUND

Many computer or communication devices rely on a keyboard or a keypad to provide part of a user interface. However, using the keyboard or keypad is often cumbersome and/or inconvenient. In addition, other devices that use touch screens to emulate a keyboard or a keypad may not show significant improvements over devices that use a keyboard or a keypad.

SUMMARY

According to one aspect, a method may include receiving a signal that comprise information about a touch pattern on a tag, identifying the touch pattern based on the received signal, validating tag-specific information in the received signal by comparing the identified touch pattern and information that is stored prior to receiving the signal, and performing an action that is specified by the tag-specific information if the tag-specific information is validated.

Additionally, identifying the touch pattern may include identifying a gesture formed by one or more touches.

Additionally, identifying a gesture may include identifying the gesture as at least one of: a one-finger gesture; a two-finger gesture; a continuous gesture; a discontinuous gesture; a proximity gesture; a sweeping gesture; or as taps.

Additionally, the method may further include accepting a first touch pattern from a user, identifying parameters from the first touch pattern, and storing the identified parameters.

Additionally, validating tag-specific information may include obtaining parameters from the identified touch pattern, and comparing the obtained parameters to the stored parameters.

Additionally, identifying parameters may include at least one of: measuring duration of time to complete the first touch pattern; measuring a size of a finger for each touch; measuring a speed of a finger movement; determining a shape of a finger for each touch; measuring distances between fingers; measuring distance between the user and the tag; or determining a fingerprint.

Additionally, performing an action may include receiving a request for data, and sending the data in response to the request.

Additionally, performing an action may include at least one of: downloading information from a remote device in a network; or completing a commercial transaction.

Additionally, performing an action may further include at least one of: displaying the downloaded information; or aurally conveying the downloaded information.

Additionally, the method may further include transmitting a carrier signal to the tag to obtain a backscattered signal from the tag.

Additionally, the method may further include identifying a touch based on a strength profile of a backscattered signal from the tag.

According to another aspect, a computer-readable memory may include computer-executable instructions for receiving a signal from a remote tag, identifying one or more touches on the remote tag based on the received signal, identifying a gesture based on the identified one or more touches, extracting parameters from the identified gesture, comparing the extracted parameters to stored parameters, and communicating with a remote device based on information that is provided by the received signal if comparing the extracted parameters to the stored parameters results in a match.

Additionally, the remote tag may include one of: a passive radio frequency identification (RFID) tag; an active RFID tag; a polymer tag; or a surface with a reflective code.

Additionally, the signal may include at least one of: information that is specific to the remote tag; information that indicates whether the remote tag is touched; or information that identifies a touch pattern.

Additionally, the computer-executable instructions for identifying one or more touches may include computer-executable instructions for identifying one or more touches based on a strength profile of the signal from the tag.

Additionally, the computer-readable memory may further include computer-executable instructions for sending a signal to the remote tag to receive a backscattered signal.

Additionally, the computer-executable instructions for communicating with a remote device may include computer-executable instructions for at least one of: providing information associated with purchasing a product that is identified by the information; or downloading content from a remote device in a network.

Additionally, the computer-executable instructions for communicating with a remote device may include computer executable instructions for sending a request for data that is referenced in the information, and receiving the data that is sent from the remote device in response to the request.

Additionally, the computer-readable memory may further include computer-executable instructions for storing the parameters associated with a plurality of touch patterns prior to receiving the signal.

According to yet another aspect, a device may include means for identifying a gesture on a surface of a tag based on a signal from the tag, means for determining if parameters that characterize the gesture match parameters that are stored in the device; and means for performing an action with one or more remote devices that are connected to a network based on information that is provided in the signal if the parameters that characterize the gesture match the parameters that are stored in the device.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

FIG. 6A shows an exemplary touch pattern as a function of time;

FIG. 6B shows exemplary touch patterns on the surface of a display;

FIG. 6C illustrates a table that may include different types of parameters that may be obtained for each of the patterns that are shown in FIG. 6A and FIG. 6B;

DETAILED DESCRIPTION OF EMBODIMENTS

The following detailed description refers to the accompanying drawings. The same reference numbers in different drawings may identify the same or similar elements.

The term "touch," as used herein, may refer to a touch of a finger, a body part, or a pointing device (e.g., a stylus, pen, etc.). A touch may be deemed to have occurred if a sensor detects a touch, by virtue of the proximity of the body part or device to the sensor, even if physical contact has not occurred. The term "touch screen," as used herein, may refer not only to a touch-sensitive screen, but a screen that may signal a touch when the finger, body part, or device is close to the screen (e.g., a capacitive screen, a near field screen, etc.).

The term "touch pattern," as used herein, may refer to a pattern that is made on a surface by tracking one or more touches within a time period.

In implementations described herein, a touch or a single set of touches on an object may cause a transfer of information regarding the object to a device. A hand that touches the object may then be immediately free for other activities, such as holding the object, touching another object, etc.

For example, assume that a user wishes to download a piece of music. In the example, a user may touch a tag (e.g., a tag that is attached to a list of songs) that represents the media content with a specific gesture, and the content may be downloaded to the user's device (e.g., a portable phone). In another example, a user may touch a grocery item, and the user may obtain a feedback on the touch with a sound, a vibration, or information about the item via a user's phone or another device (e.g., via a headset that is coupled to the phone). In yet another example, if the user is shopping in a furniture store, information about the size of a sofa may be provided via the user's device when the user touches part of the sofa.

Figure 1:
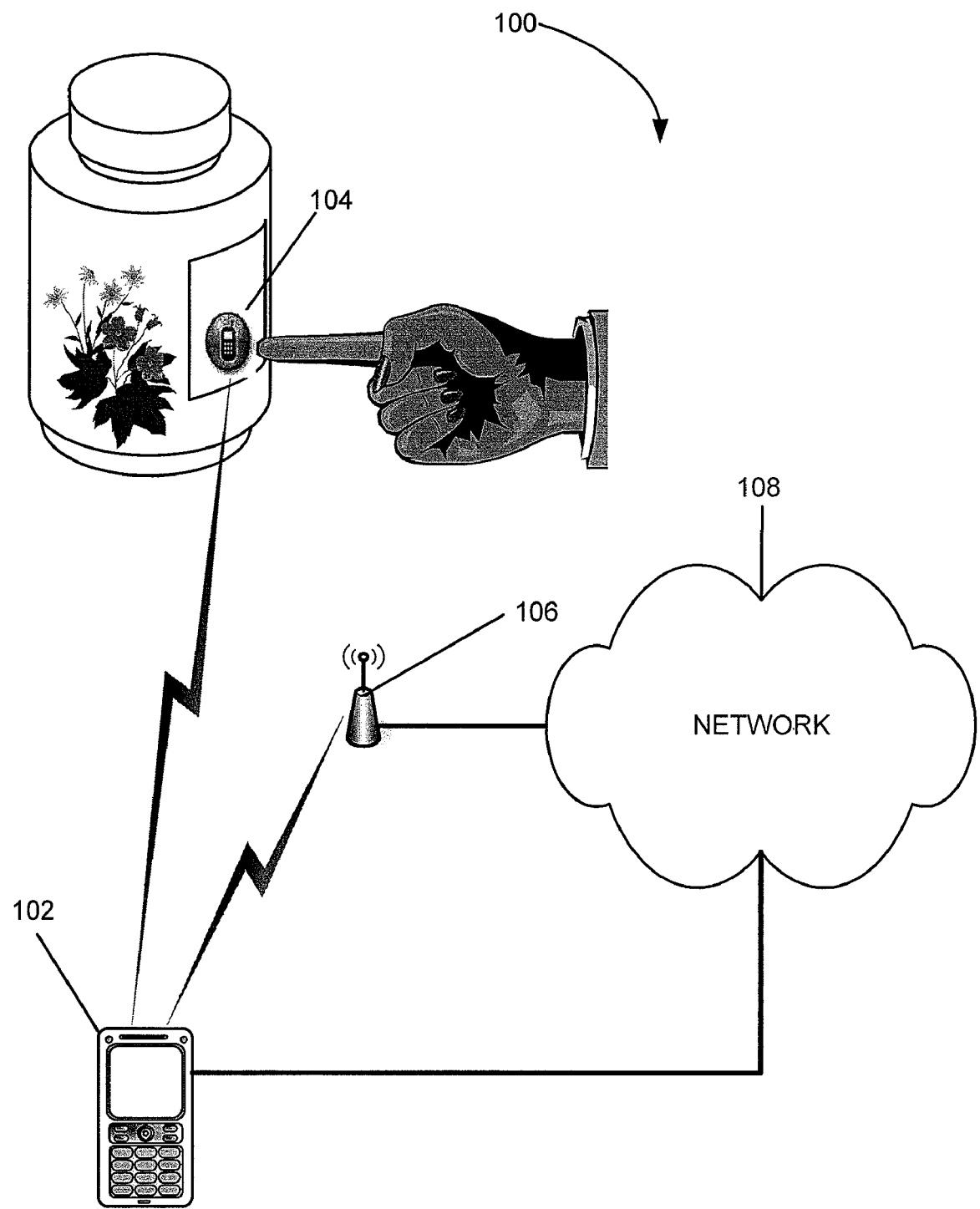
FIG. 1 shows a system in which concepts described herein may be implemented.

FIG. 1 shows an exemplary system in which concepts described herein may be implemented. As shown, system 100 may include device 102, a tag 104, a wireless access point (WAP) 106 and a network 108. In other implementations, system 100 may include more, fewer, or different components.

Device 102 may include any of the following devices: a gaming console (e.g. Nintendo Dual Screen (DS)); a telephone, such as a radio telephone or a mobile telephone; a personal communications system (PCS) terminal that may combine a cellular radiotelephone with data processing, facsimile, and/or data communications capabilities; an electronic notepad; a laptop; a personal computer (PC); a personal digital assistant (PDA) that can include a radiotelephone; or another type of computation or communication device with a radio-frequency identification (RFID) receiver and/or a RFID tag.

Tag 104 may include a device or an object that transmits information based on touches on tag 104. The information may indicate whether tag 104 is touched and may include an identifier/information associated with a touch pattern and tag 104. In one implementation, tag 104 may include a passive object that does not include an internal power source (e.g., a polymer tag, a reflective matrix code tag, a microchip tag, etc.). In such an implementation, tag 104 may send information by backscattering (e.g., reflect) a carrier signal from device 102 or a remote source. The strength and the pattern of the backscattered signal from tag 104 to device 102 may depend on an interference pattern caused by the touches on tag 104. In another implementation, tag 104 may include an internal power source to generate a signal. In such an implementation, tag 104 may detect a particular touch pattern and encode and/or modulate its signal/information in accordance with the detected pattern. The encoded/modulated signal may be transmitted to all devices within a given range.

WAP 106 may include a device for accessing network 108, such as a router that is able to receive and transmit wireless and/or wired signals, or any other device that provides access to a network. WAP 106 may communicate with device 102 using any wireless communication protocol. Device 102 may connect to network 108 via WAP 106. In other implementations, device 102 may connect to network 108 via wired and/or wireless connections.

Network 108 may include the Internet, an ad hoc network, a local area network (LAN), a wide area network (WAN), a metropolitan area network (MAN), a cellular network, a public switched telephone network (PSTN), an intranet, any other network, or combinations of networks.

In FIG. 1, if a user wishes to transfer information (e.g., product information for plant food) from tag 104 to device 102, the user may touch tag 104 in accordance with a predetermined gesture. In response, tag 104 may convey information related to the tag and the touch pattern to device 102. Device 102 may detect the pattern, validate the pattern, and use the conveyed information to perform an action (e.g., relay product related information to the user, conduct a commercial transaction, etc.).

Exemplary Device

Figure 2:
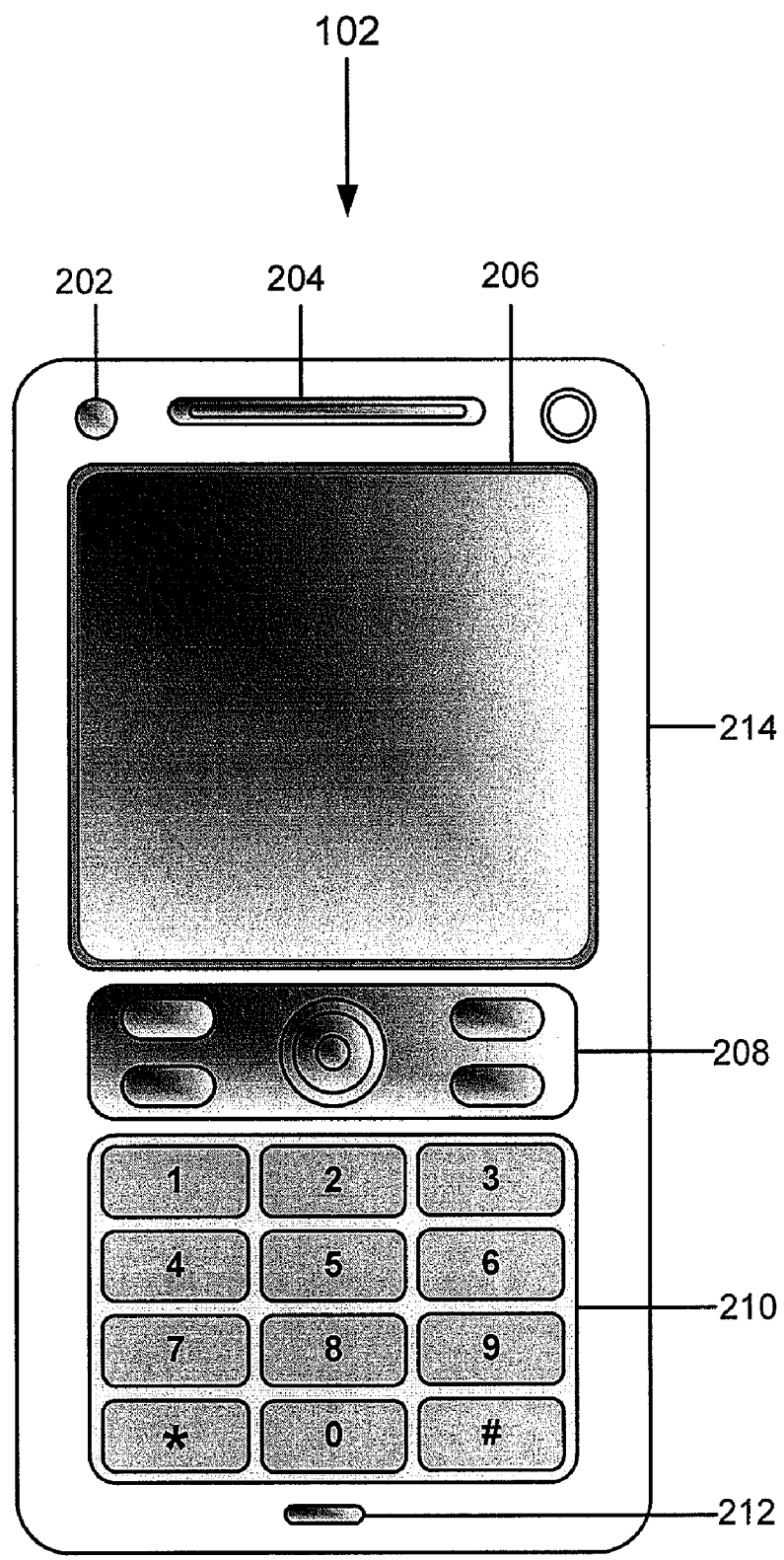
FIG. 2 is an exemplary diagram of a device of FIG. 1.

FIG. 2 is an exemplary diagram which may correspond to device 102. As illustrated, device 102 may include a camera 202, a speaker 204, a display 206, control buttons 208, a keypad 210, a microphone 212, and a housing 214. Camera 202 may enable a user to view, capture and store media (e.g., images, video clips) of a subject in front of device 102. Speaker 204 may provide audible information to a user of device 102. Display 206 may include a display screen to provide visual information to the user, such as video images or pictures, and may include a touch screen (e.g., a capacitive screen, near field screen) to accept inputs from a user. Control buttons 208 may permit the user to interact with device 102 to cause device 102 to perform one or more operations, such as place or receive a telephone call. Keypad 210 may include a standard telephone keypad. Microphone 212 may receive audible information from the user. Housing 214 may provide a casing for components of device 102 and may protect the components from outside elements.

Figure 3:
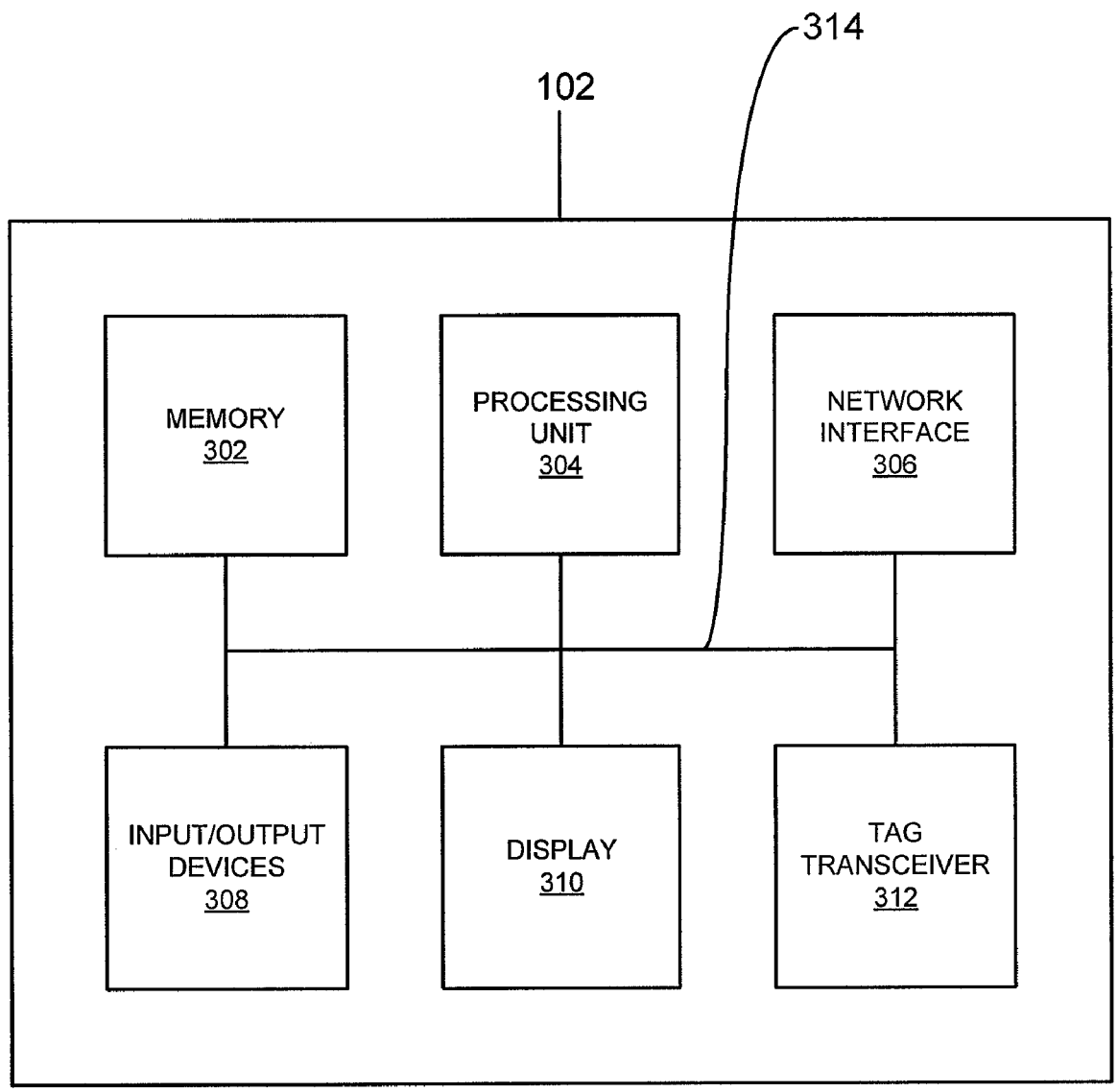
FIG. 3 is an exemplary block diagram of the device of FIG. 2.

FIG. 3 shows an exemplary block diagram of device 102 of FIG. 2. As shown, device 102 may include memory 302, processing unit 304, network interface 306, input/output devices 308, display 310, tag transceiver 312 and bus 314. In other implementations, device 102 may include more, fewer, or different components. For example, device 102 may include a zoom lens assembly and/or auto-focus sensors.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include one or more processors, microprocessors, and/or processing logic capable of controlling device 102.

Network interface 306 may include any transceiver-like mechanism that enables device 102 to communicate with other devices and/or systems. For example, network interface 306 may include mechanisms for communicating via a network, such as the Internet, a terrestrial wireless network (e.g., wireless local area network (WLAN)), a satellite-based network, etc. Additionally or alternatively, network interface 306 may include a modem, an Ethernet interface to a local area network (LAN), and/or an interface/connection for connecting device 102 to other devices (e.g., a Bluetooth interface). Further, network interface 306 may include receivers, such as a Global Positioning System (GPS) receiver. Input/output devices 308 may include a keyboard, a keypad (e.g., keypad 210 of FIG. 2), a button (e.g., control buttons 208), a mouse, a speaker (e.g., speaker 204), a microphone (e.g., microphone 212), a Digital Video Disk (DVD) writer, a DVD reader, Universal Serial Bus (USB) lines, and/or other types of devices for converting physical events or phenomena to and/or from digital signals that pertain to device 102.

Display 310 may include a device that can display signals generated by device 102 as images on a screen (e.g., a liquid crystal display (LCD), cathode ray tube (CRT) display, organic light-emitting diode (OLED) display, surface-conduction electro-emitter display (SED), plasma display, field emission display (FED), bistable display, etc.) and a touch screen or a panel-enabled display that may function as a user input interface. For example, display 310 may include a pressure-sensitive (e.g., resistive), near field-sensitive (e.g., capacitive), acoustically-sensitive (e.g., surface acoustic wave), photo-sensitive (e.g., infra-red), and/or any other type of display overlay that allows display 310 to be used as an input device.

Tag transceiver 312 may include a device for reading or receiving data/signals from tags, such as tag 104. In some implementations, tag transceiver 312 may also include a transmitter for sending signals to tag 104. This may be used in situations where tag 104 passively backscatters the signal from tag transceiver 312.

Bus 314 may provide an interface through which components of device 102 can communicate with one another.

Figure 4:
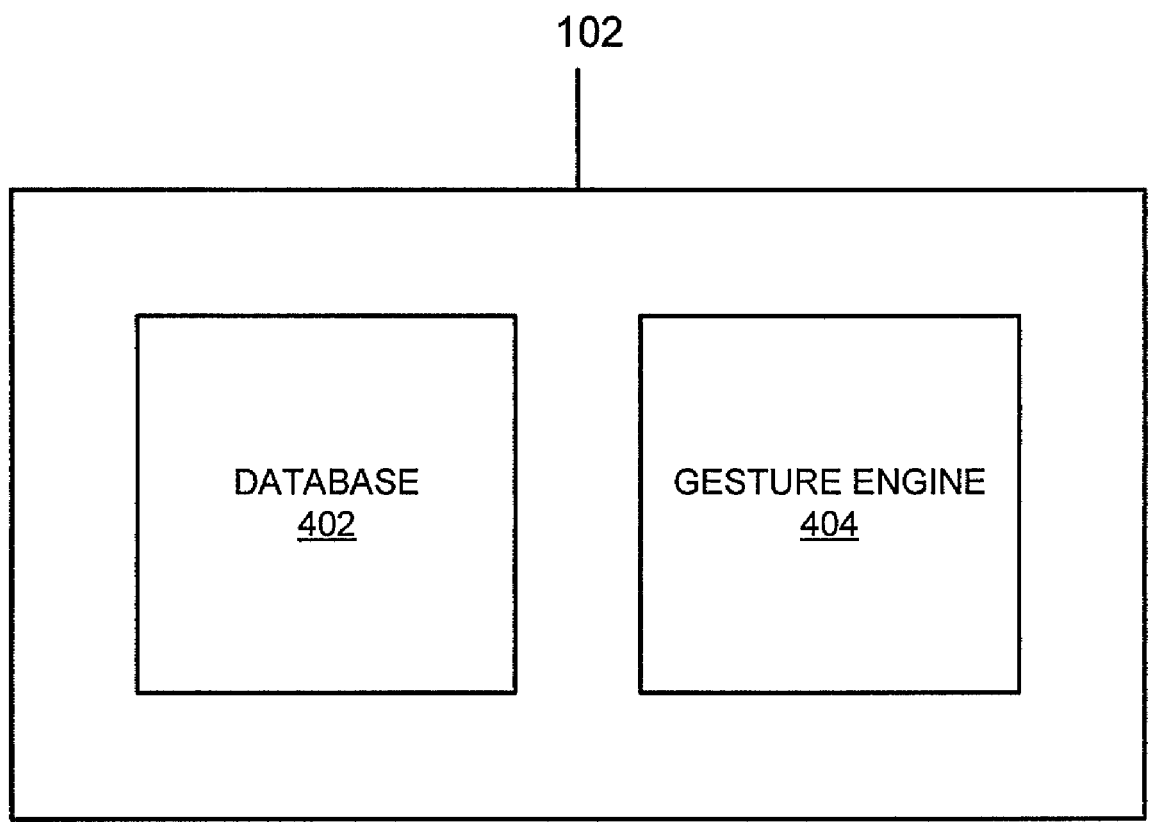
FIG. 4 is an exemplary functional block diagram of the device of FIG. 2.

FIG. 4 is an exemplary functional block diagram of exemplary components that may be included in device 102. As shown, device 102 may include a database 402 and a gesture engine 404. In other implementations, device 102 may include fewer, additional, or different types of components than those illustrated in FIG. 4 (e.g., web browser).

Database 402 may be included in memory 302 (FIG. 3) and act as an information repository for gesture engine 404. For example, gesture engine 404 may retrieve and/or store images in database 402. Gesture engine 404 may include hardware and/or software for processing signals that are received at tag transceiver 312. More specifically, gesture engine 404 may use the signal received from tag 104 to detect touches on tag 104 and a pattern associated with the touches and to obtain specific information that pertains to tag 104. The touch detection, the pattern, and the specific information related to tag 104 may be used to validate the information to perform an action (e.g., download content associated with tag 104 from a network device). Upon a successful validation, the action may be performed.

For example, in response to signals that are received at tag transceiver 312, gesture engine 404 may cause processing unit 304 (FIG. 3) to accept and/or transmit information (e.g., a video, a picture, a piece of music, a link, text, a document, etc.) to and/or from a remote device (e.g., server). In another example, gesture engine 404 may cause the completion of a transaction (e.g., a purchase) that is associated with receiving the information from the remote device, by, for example, making a withdrawal from an electronic wallet/account of the user.

Exemplary Process for Using Touches to Transfer Information

Figure 5:
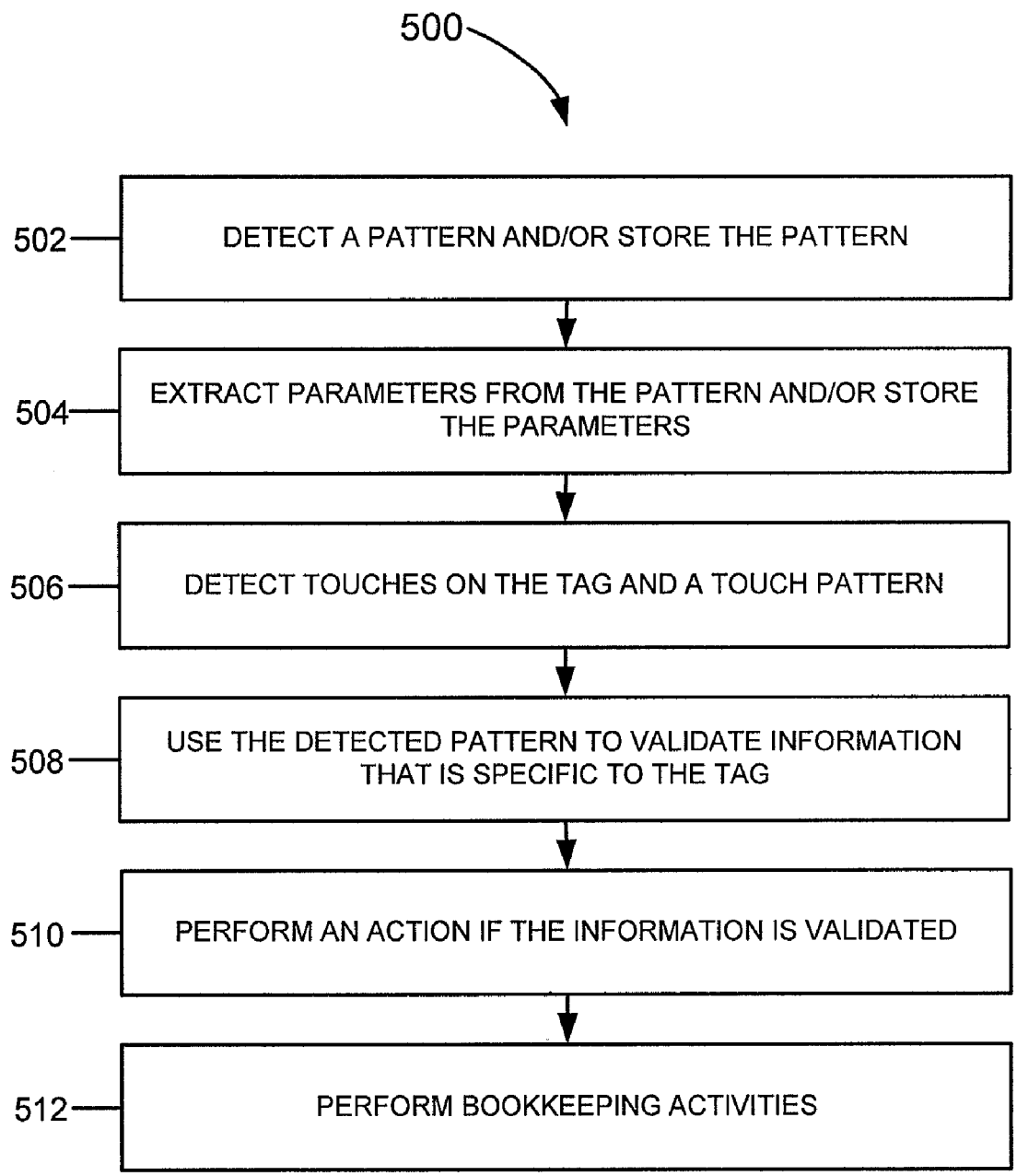
FIG. 5 shows a flowchart of an exemplary process for using touches to transfer information.

FIG. 5 shows an exemplary process 500 for using touches to transfer information to device 102. Process 500 may start at block 502, where a touch pattern may be determined and/or the stored at device 102. The touch pattern may be inputted via a touch screen or a touch-sensitive surface of device 102. In another implementation, the touch pattern may be inputted remotely, via a reflective tag, an active RFID tag, etc.

FIGS. 6A and 6B show different types of patterns that may be determined. In one implementation, the patterns may be determined based various pattern recognition systems (e.g., an artificial neural network-based system, on statistical model-based system (e.g., a hidden Markov model), a feature recognition system, etc.). FIG. 6A shows a pattern as a function of time. As illustrated, a pattern 602 may include a number of taps. Each tap may arrive at one or more locations on an input screen and may be separated from the next tap by a time period.

FIG. 6B shows touch patterns on a surface (e.g., surface of a display). As illustrated, the surface touch patterns may include a one-finger gesture, a two-finger gesture, a continuous gesture, a discontinuous gesture, or a sweeping gesture. As implied by the terms, a one-finger gesture and a two-finger gesture may be formed by one and two fingers, respectively. A continuous gesture may be formed by a touch that moves against an input surface without a break, and a discontinuous gesture may be formed by multiple touches, with breaks from the surface between the touches. A sweeping gesture may be formed by moving a body part or a pointing device from one position relative to tag 104 (e.g., top, bottom, left, right of tag 104) to another position (e.g., bottom, top, right, left of tag 104). The sweeping gesture may be made with/without touching tag 104.

In FIG. 6B, if used as a key, the leftmost gesture (i.e., one-finger gesture) provides the lowest level of security among those illustrated, and the rightmost gesture provides the highest level of security. In different implementations, the touch patterns may include patterns that involve additional fingers (e.g., a three-finger touch), different parts of human body (e.g., palm of hand), touches from various pointing devices, or proximity gestures (e.g., gestures that are made from a body part or a pointing device that is not touching the tag).

Parameters may be obtained from the pattern and/or stored at device 102 (block 504). FIG. 6C illustrates a table 604 that includes different types of parameters (i.e., items on the leftmost column of a table 604) that may be obtained for each of the patterns that are illustrated in FIG. 6A and FIG. 6B. As shown, the parameters may include finger size (i.e., size of a contact area on an input surface), finger shape (i.e., shape of a contact area), finger speed, capacitance (i.e., change in capacitance at an input surface if a body part is close to the surface), time (i.e., the amount of time taken to complete the pattern), distance between fingers, pattern continuity (i.e., a number of breaks between touches that form a pattern), and the distance from a body part (e.g., finger) or a pointing device to a tag. The capacitance may depend on a particular touch screen that is used as an input display, and the distance between fingers may depend on a specific gesture. In addition, FIG. 6C shows, for each pattern (i.e., an item in the top row of table 604), whether a particular parameter may be extracted and used as part of an encryption/decryption key for encoding or decoding the information that is represented by the graphical objects. For example, in FIG. 6C, a checkmark may indicate that finger size may be used to derive a sequence of characters that can be used to form an encryption key. In different implementations, other parameters may be obtained from the touch patterns, such as fingerprints, three-dimensional impression of fingers or hands, etc.

Touches and a touch pattern on tag 104 may be detected (block 506). Depending on implementation, the touches and the touch pattern on tag 104 may detected at device 102 or tag 104.

If tag 104 is implemented as an active device, tag 104 may recognize and determine the touches and the touch pattern on its surface. In some implementations, parameters that are associated with the touch pattern may be extracted and wirelessly transmitted to all nearby devices. If tag 104 is implemented as a passive object, a signal that is sent from device 102 may be backscattered by tag 104 in accordance with the corresponding touches on tag 104. The backscattered signal may arrive at device 102, where the backscattered signal may be used to infer the touch and to reconstruct the touch pattern.

Figure 7:
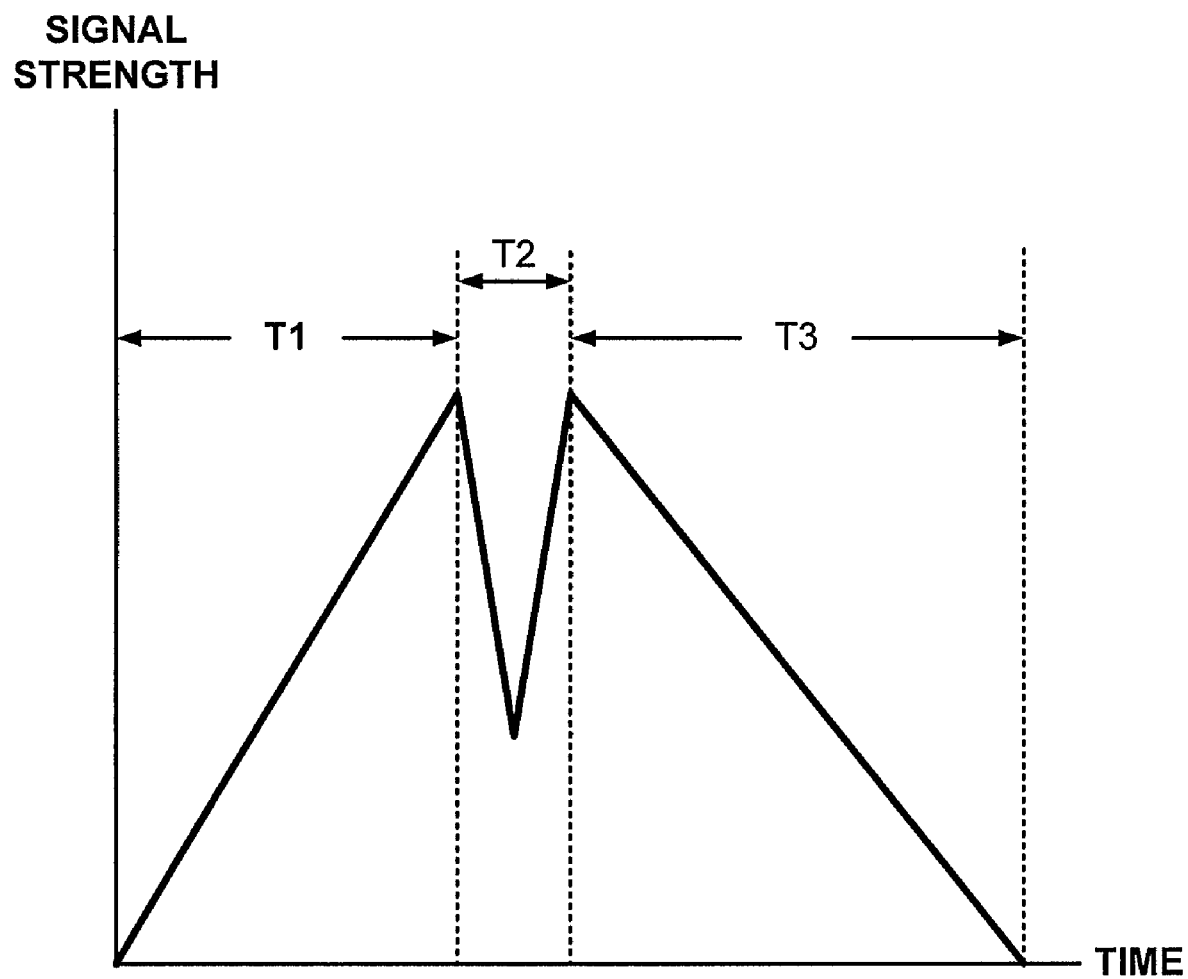
FIG. 7 shows an exemplary graph of the strength of a signal from a tag that is touched.

FIG. 7 shows an exemplary graph of the strength of a signal from tag 104 when tag 104 is touched, provided tag 104 is implemented as a passive tag. As a user that carries tag transceiver 312 approaches tag 104, the signal strength may increase (e.g., region T1 in FIG. 7); if the user's hand or an extremity touches and partly covers tag 104, the signal strength may drop abruptly (e.g., region T2) due to an occlusion of tag 104; if the user's hand moves away from tag 104, the signal may regain the previous strength level; and the signal strength may gradually decrease if the user and tag transceiver 312 move away from tag 104.

In different implementations, a touch may not necessarily generate a strength profile as illustrated in FIG. 7. For example, by having different portions of tag 104 to backscatter an incoming signal or send signals differently from other portions of the passive tag, touches on the surface of tag 104 may convey signals that may be used to reconstruct the touch pattern at device 102.

Returning to FIG. 5, at block 508, the detected pattern may be used to validate information that is specific to tag 104. As explained above, the signal from tag 104 may carry, in addition to the touch pattern, information that is specific to tag 104. The information may be validated by device 102 if device 102 can confirm that the user has caused the generation of the touch pattern, by matching the detected pattern to one of the patterns that are stored at block 502. In some implementations, matching the patterns may entail comparing the parameters that have been stored at block 504 to parameters of the detected pattern. For example, assume tag 104 performs pattern detection based on the touches, extracts parameters from the detected pattern, and sends the parameters to device 102. In such a case, device 102 may compare the received parameters to those stored at block 504.

If the information is validated, an action that is specified by or associated with the information may be performed (block 510). The action may involve a series of communication events, such as an exchange of information between device 102 and devices in network 108, a commercial transaction via other devices in network 108, etc. For example, if the information from tag 104 specifies a Universal Resource Locator (URL), the URL may be accessed by device 102 to conduct a web-transaction at the site identified by the URL. In another example, the information may provide a network address, a port number, authentication information, and a key with which device 102 can access a remote database via wireless communication. The database may provide device 102 with product information based on the key. In still other implementations, the information of interest may be sent to device 102 along with the touch pattern.

Depending on the implementation, the action may involve a communication channel or a link that is different from the channel or the link that is used for receiving information from tag 104. For example, device 102 may communicate with devices in network 108 via WLAN and with tag 104 via a Bluetooth or an infrared link.

At block 512, bookkeeping activities may be performed. For example, if the information that is specific to tag 104 is not validated at block 508, the information and/or touch pattern may be deleted from device 102. In another example, if the action includes a monetary transaction, proper accounts (e.g., the account of the user that received a movie, a picture, etc.) may be charged or credited. If the credit is provided in the form of a discount coupon, the coupon can be used when content is purchased.

In the above, another person with a device similar to device 102 may be close to a user of device 102. In such a case, problems are unlikely to arise, because the signal from tag 104 may have a limited range (e.g. 1.5 meters). The limited range may permit the other user from receiving a touch pattern unless the other user is within the range. Furthermore, because the touch pattern at tag 104 may be specific to a particular device, the device that is carried by the other user may not be able to validate the tag-specific information based on the touch pattern.

Example

Figure 8:
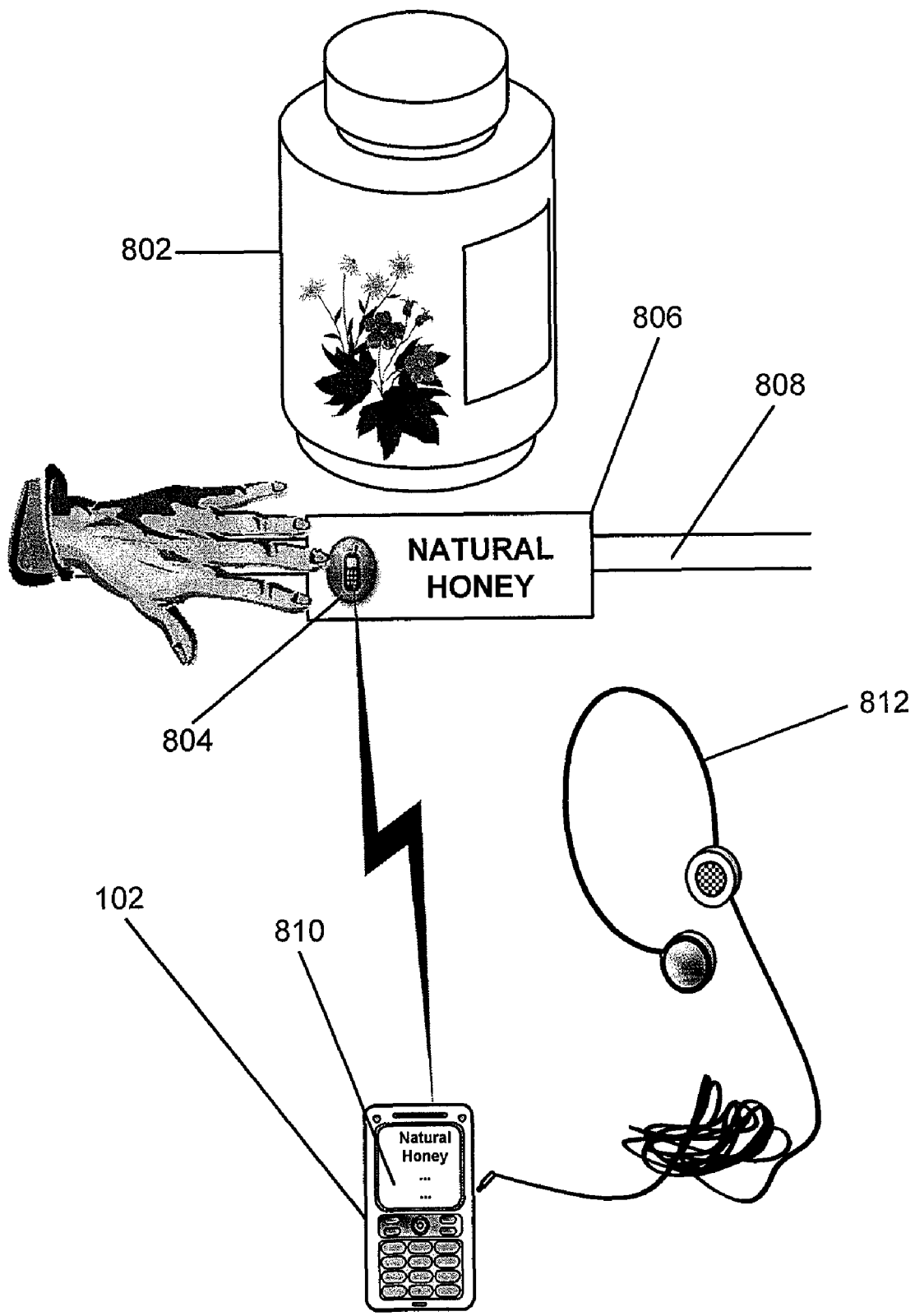
FIG. 8 illustrates an alternative implementation of the concepts described herein.

The following example illustrates processes involved in using touches to transfer information to device 102, as depicted in FIG. 8. The example is consistent with the exemplary process described above with reference to FIG. 5.

In FIG. 8, assume that Emma has stored a circular touch pattern in device 102, such that any circular touch pattern that device 102 receives may be validated based on the stored circular pattern. Assume that Emma is shopping in a grocery store, and that Emma is carrying device 102. When Emma is near Natural Honey 802, Emma gestures and makes a circular pattern on a surface of an RFID tag 804 attached to a product description plate 806 for shelf 808.

RFID tag 804 backscatters a carrier signal that is transmitted from device 102. Device 102 receives the backscattered signal, processes the signal, and detects a circular touch pattern. Device 102 compares the detected circular pattern against a stored circular pattern (e.g., by comparing parameters that pertain to the patterns), and validates tag-specific information that is provided by the backscattered signal. As described above, in alternative implementations, RFID tag 804 may be an active device that may transmit a signal conveying the touch-related information to device 102.

The tag-specific information provides a product identifier, a network address of a server from which product information may be obtained, authentication information, and a port number of the server application. Device 102 automatically connects to a network via a WAP (not shown) and uses the authentication information, the network address, the port number, and the authentication information to interact with the server application. Device 102 downloads information related to Natural Honey from the server application.

The information is shown on the display of device 102. The information may also be conveyed aurally to Emma through earphones 812 or a wireless headset (not shown). A vibrator within device 102 may also vibrate when the information is available. In the example, earphones 812 may audibly provide nutritional information related to Natural Honey and point out, "Natural Honey contains traces of nuts." Emma may be allergic to nuts, and therefore may decide against purchasing Natural Honey.

The above example illustrates how touches may be used to transfer information to device 102. The concepts illustrated by the example, however, may be implemented for and applied to different situations. For example, in one implementation, the above described mechanism may be used to transfer media content, such as a piece of music, a video clip, etc. In the example, a user may touch a tag that represents the media content in a specific pattern, and the content may be transferred to the user's device. In another example, a user may touch a product, and the user may obtain a feedback on the touch with a sound, a vibration, or information about the product from device 102 (e.g., via a headset that is coupled to device 102).

Conclusion

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to an exemplary process illustrated in FIG. 5, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, by a user device, a signal comprising information associated with a touch pattern on a tag attached to, or associated with an object, and tag-specific information specifying a corresponding selective action to be performed with respect to the object;
   capturing a strength profile associated with the signal, wherein the signal strength increases to a first predetermined level as the user device approaches the tag, the signal strength decreases to a second predetermined level when a touch associated with the touch pattern is received on the tag, the signal strength returns to the first predetermined level when the touch is removed from the tag, and the signal strength decreases to a level less than both the first predetermined level and the second predetermined level as the user device moves away from the tag;
   extracting the information associated with the touch pattern from the received signal based on the capturing step;
   extracting at least one user specific parameter from the touch pattern;
   using the at least one user specific parameter as part of an encryption or decryption key for encoding or decoding the tag-specific information;
   comparing the information associated with the touch pattern from the received signal with validation information previously stored on the user device, the validation information corresponding to a plurality of predetermined valid touch patterns; and
   if the information associated with the touch pattern from the received signal matches the validation information corresponding to one of the predetermined valid touch patterns to confirm that a user of the user device has caused the generation of the touch pattern, performing, by the user device, the action specified by the tag-specific information.

2. The method of claim 1, wherein the information associated with the touch pattern comprises information related to a gesture formed by one or more touches.

3. The method of claim 2,
   wherein the information related to the gesture formed by one or more touches includes information related to:
   a one-finger gesture;
   a two-finger gesture;
   a continuous gesture;
   a discontinuous gesture;
   a proximity gesture;
   a sweeping gesture;
   or a tap.

4. The method of claim 1, further comprising:
   accepting a first touch pattern from a user;
   identifying parameters from the first touch pattern; and
   storing the identified parameters.

5. The method of claim 4,
   wherein comparing the information associated with the touch pattern from the received signal with validation information previously stored on the user device comprises comparing the at least one user specific parameter to stored parameters.

6. The method of claim 4, where identifying parameters includes at least one of:
   measuring a duration of time to complete the first touch pattern;
   measuring a size of a finger for each touch;
   measuring a speed of a finger movement;
   determining a shape of a finger for each touch;

measuring distances between fingers;

measuring distance between the user and the tag; or determining a fingerprint.

7. The method of claim 1, where performing the action further comprises:

receiving a request for data; and sending the data in response to the request.

8. The method of claim 1, where performing the action further comprises at least one of:

downloading information from a remote device in a network; or completing a commercial transaction.

9. The method of claim 8, where performing the action further comprises at least one of:

displaying the downloaded information via a display of the user device; or aurally conveying the downloaded information.

10. The method of claim 1, where the received signal comprises a backscattered signal, the method further comprising:

transmitting a carrier signal to the tag to obtain the backscattered signal from the tag.

11. A computer-readable memory, comprising computer-executable instructions for:

receiving, at a device, a signal from a remote tag attached to, or associated with an object, where the signal includes information including information associated with a touch pattern, information indicating a network address, and authentication information, capturing a strength profile associated with the signal, wherein the signal strength increases to a first predetermined level as the device approaches the remote tag, the signal strength decreases to a second predetermined level when one or more touches associated with the touch pattern are received on the remote tag, the signal strength returns to the first predetermined level when the one or more touches are removed from the remote tag, and the signal strength decreases to a level less than both the first predetermined level and the second predetermined level as the device moves away from the remote tag, identifying the one or more touches on the remote tag based on the capturing step, identifying a touch pattern based on the identified one or more touches, extracting at least one user specific parameter from the identified touch pattern, using the at least one user specific parameter to form an encryption or decryption key for encoding or decoding information associated with the touch pattern;

comparing the at least one extracted user specific parameter to a group of one or more previously stored validation parameters, the validation parameters corresponding to one of a plurality of predetermined valid touch patterns, and if the at least one user specific parameter extracted from the identified touch pattern matches the validation parameters corresponding to one of the predetermined valid touch patterns, communicating with a remote device, via the network address and using the authentication information, to selectively receive corresponding data associated with the object attached to or associated with the remote tag.

12. The computer-readable memory of claim 11, where the remote tag includes an active radio frequency identification (RFID) tag.

13. The computer-readable memory of claim 11, where the signal includes:

information that is specific to the remote tag;

information that indicates whether the remote tag is touched; and information that identifies the touch pattern.

14. The computer readable memory of claim 11, where the received signal comprises a backscattered signal, the computer readable memory further comprising computer-executable instructions for:

sending a signal to the remote tag to receive the backscattered signal.

15. The computer-readable memory of claim 11, where the computer-executable instructions for communicating with the remote device include computer-executable instructions for providing information associated with purchasing a product.

16. The computer-readable memory of claim 15, where the computer-executable instructions for communicating with the remote device include computer executable instructions for:

sending a request for data that is referenced in the information from the signal; and receiving the data that is sent from the remote device in response to the request.

17. A user device for performing a selective action with respect to an object associated with a tag comprising:

means for capturing a strength profile associated with a signal from the tag wherein the signal strength increases to a first predetermined level as the user device approaches the tag, the signal strength decreases to a second predetermined level when a touch is received on the tag, the signal strength returns to the first predetermined level when the touch is removed from the tag, and the signal strength decreases as the user device moves away from the tag;

means for identifying a gesture on a surface of the tag based on capturing the strength profile from the tag, the signal comprising encoded tag specific information;

means for determining whether at least one user specific parameter that characterizes the gesture matches validation parameters corresponding to one of a plurality of predetermined valid gestures, wherein the validation parameters are stored in the user device;

means for encoding or decoding the tag specific information comprised in the signal based on an encryption or decryption key formed using the at least one user specific parameter that characterizes the gesture; and means for performing, with respect to the object associated with the tag, a selective action with one or more remote devices that are connected to a network based on the tag specific information that is comprised in the signal if the at least one user specific parameter that characterizes the gesture matches the validation parameters corresponding to one of the predetermined valid gestures.

* * * * *